US008473241B2

(12) United States Patent
Foxlin

(10) Patent No.: US 8,473,241 B2
(45) Date of Patent: Jun. 25, 2013

(54) NAVIGATION TRAJECTORY MATCHING

(75) Inventor: Eric Foxlin, Billerica, MA (US)

(73) Assignee: Thales Visionix, Inc., Clarksburg, MD (US)

( * ) Notice: Subject to any disclaimer, the term of this patent is extended or adjusted under 35 U.S.C. 154(b) by 253 days.

(21) Appl. No.: 12/847,186

(22) Filed: Jul. 30, 2010

(65) Prior Publication Data

US 2011/0054836 A1    Mar. 3, 2011

Related U.S. Application Data

(60) Provisional application No. 61/230,980, filed on Aug. 3, 2009.

(51) Int. Cl.
*G06F 15/00*        (2006.01)
(52) U.S. Cl.
USPC .................................................. 702/150
(58) Field of Classification Search
USPC ........................... 702/150, 151; 701/200, 207
See application file for complete search history.

(56) References Cited

U.S. PATENT DOCUMENTS

2008/0077326 A1* 3/2008 Funk et al. .................... 701/220

OTHER PUBLICATIONS

Wan, Sheng, Foxlin, Eric, "Improved Pedestrian Navigation Based on Drift-Reduced MEMS IMU Chip," Proceedings of the 2010 International Technical Meeting of the Institute of Navigation, San Diego, CA, Jan. 2010, pp. 220-229.
E. Foxlin, "Pedestrian Tracking with Shoe-Mounted Inertial Sensors," IEEE Computer Graphics and Applications, vol. 25, Issue 6, Nov.-Dec. 2005, pp. 38-46.

* cited by examiner

*Primary Examiner* — Bryan Bui
(74) *Attorney, Agent, or Firm* — Arent Fox LLP

(57) ABSTRACT

Among other things, first data is received from an inertial tracking device worn by a first person, the first data approximating locations along a first path that was traversed by the first person. Second data is received from an inertial tracking device worn by a second person, the second data approximating locations along a second path, similar to the first path, that is being traversed by the second person. A determination is made about how to guide the second person to reach the first person by using the first data and the second data to correlate locations along the first path and corresponding locations along the second path.

23 Claims, 6 Drawing Sheets

NAVIGATION TRAJECTORY MATCHING

CROSS REFERENCE TO RELATED APPLICATIONS

This application claims priority from U.S. Provisional Application Ser. No. 61/230,980, filed on Aug. 3, 2009, which is incorporated herein by reference in its entirety.

The contents of U.S. application Ser. No. 11/399,289, filed on Apr. 6, 2006 and Ser. No. 11/543,008, filed on Oct. 4, 2006 are incorporated by reference here in their entirety as part of this application. This application also incorporates by reference in their entirety the following publications:
1. E. Foxlin, "Improved Pedestrian Navigation Based on Drift-Reduced NavChip™ MEMS IMU," Abstract of Paper # Alt-2, Session D5, The Institute of Navigation GNSS 2009.
2. E. Foxlin, "Pedestrian Tracking with Shoe-Mounted Inertial Sensors," IEEE Computer Graphics and Applications, Vol. 25, Issue 6, November-December 2005, pages 38-46.

FIELD OF THE INVENTION

The invention relates to dead-reckoning systems for tracking the motion of a subject.

BACKGROUND

Human navigation systems track the motion of a pedestrian as he moves over a space. These navigation systems can be made small enough to be wearable by the pedestrian being tracked. For example, global positioning satellites ("GPS"), electromagnetic emitters/receivers, and inertial units such as accelerometers and gyroscopes have been used in such navigation systems. Inertial tracking devices are dead-reckoning systems which keep track of the current location of a subject by estimating the direction and distance traveled and adding it to a previous location estimate. These may include sophisticated inertial navigation systems, as well as simple pedometer devices which count steps with an accelerometer and may use a gyroscope and/or a compass to determine direction. In this application, the terms "inertial tracking device" and "dead-reckoning device" are used interchangeably to refer to a system which keeps track of a subject's position by accumulating increments of motion. In some cases, such a device may be subject to some drift or error accumulation over time.

SUMMARY

In general, in an aspect, a first data is received from an inertial tracking device worn by a first person, the first data approximating locations along a first path that was traversed by the first person. A second data is received from an inertial tracking device worn by a second person, the second data approximating locations along a second path, similar to the first path, that is being traversed by the second person. A determination is made about how to guide the second person to reach the first person by using the first data and the second data to correlate locations along the first path and corresponding locations along the second path.

Implementations may include one or more of the following features. The first and second persons are emergency responders. The first path and second path are not visible to a third person, for example, an outsider. The inertial tracking devices are subject to drift. The locations are at successive footsteps along the paths. The first path and second path begin at a common location. The first path and the second path are derived from the data. The derived first path or second path is repeatedly reoriented, for each of a succession of the locations.

DETAILED DESCRIPTION

Introduction

Pedestrian navigation systems are used in a variety of contexts, for example tracking emergency rescue workers, soldiers on a battlefield, or for providing location-aware computing applications. Satellite-based navigation systems, such as GPS trackers, provide a way of tracking pedestrians. However, such systems can have limited applicability. For example, a pedestrian can only be tracked by satellite-based navigation system when the pedestrian is "visible" to a sufficient number of satellites. This may not be the case, for example, when the pedestrian is in a heavily forested area or inside a building.

Inertial navigation systems also offer a way to track pedestrians. However, inertial navigation systems generally do not allow accurately tracking a pedestrian for long periods of time, because of inertial instruments' tendency to drift.

As described below, in some implementations, a "hybrid" navigation system with a GPS receiver and inertial instruments is capable of accurately tracking a pedestrian even during GPS outages.

Basic Hardware

Figure 1:
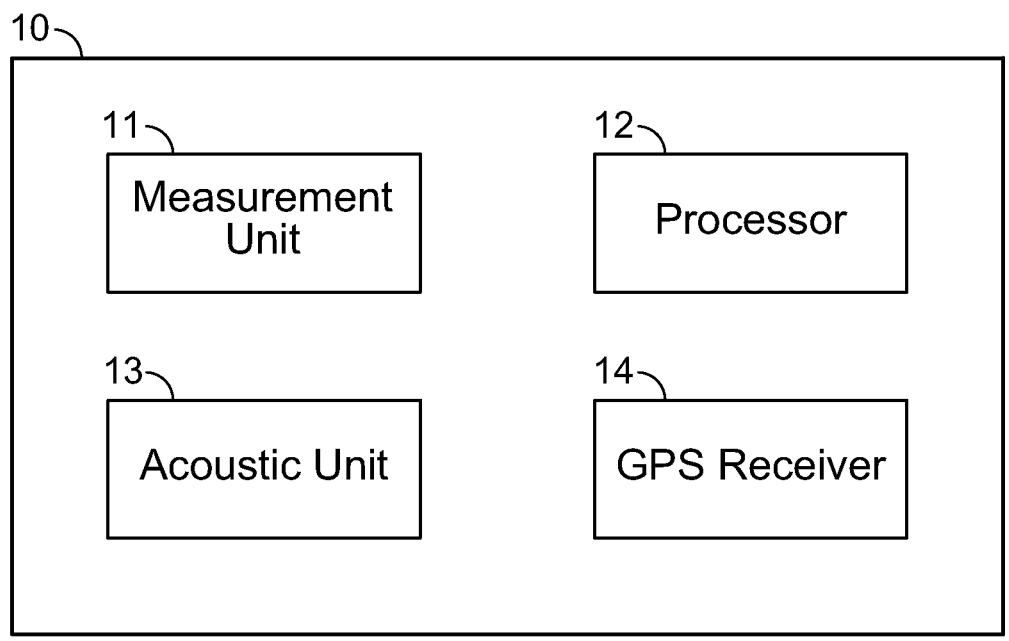
FIG. 1 is a schematic view of a navigation system.
Figure 2A:
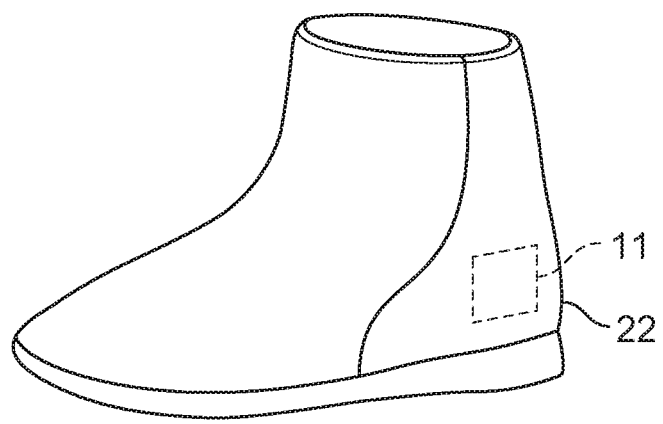
FIG. 2A-2B are schematic views of footwear with an incorporated a measurement unit.
Figure 2B:
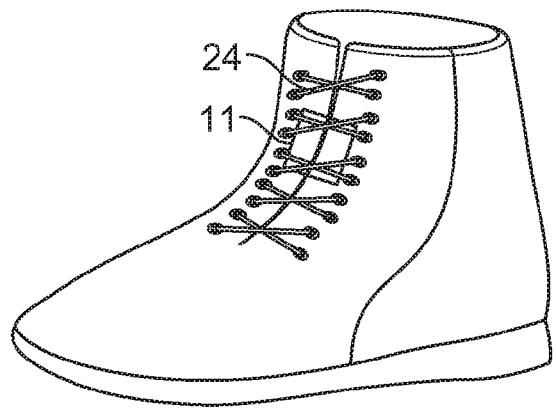

Referring to FIG. 1, a navigation system 10 is capable of determining the position and/or orientation of a mobile subject. For example, the navigation system 10 can be mounted on a pedestrian to track the pedestrian's movements. The navigation system 10 can include a measurement unit 11, a processor 12, an acoustic unit 13 and a GPS receiver 14. The measurement unit 11 includes inertial instruments that detect linear and/or angular accelerations experienced by the measurement unit 11, and generate signals indicative of such acceleration. The measurement unit 11 is mounted on the pedestrian in such a way that the measurement unit 11 is motionless when the pedestrian's foot is motionless. For example, FIG. 2A shows the measurement unit 11 fixedly mounted in the heel 22 of a shoe or a boot worn by the pedestrian. FIG. 2B shows the measurement unit 11 incorporated in the laces 24 of a shoe or boot worn by the pedestrian. For tracking a crawling subject, measurement unit 11 may also be mounted on a hand, knee, or other part of the subject that periodically remains motionless during crawling.

Referring again to FIG. 1, the navigation system 10 also includes a GPS receiver 14. The GPS receiver 14 may be carried by the pedestrian in a backpack, mounted on a belt, or generally mounted anywhere on or near the pedestrian's body. The GPS receiver 14 receives signals from a satellite or a constellation of satellites, and based on these signals generates a GPS signal that is sent to the processor 12. Based in part on the GPS signal, the navigation system 10 determines the pedestrian's position, velocity, etc. However, when the pedestrian is indoors or in a heavily forested area, the GPS receiver 14 may not receive sufficiently many signals from the satellites to be useful in determining the pedestrian's position, velocity, etc. Under these circumstances, the navigation system 10 relies on the signals generated by the measurement unit 11.

The processor 12 is in data communication with the GPS receiver 14 and with the measurement unit 11. The processor 12 processes the signals received from the GPS receiver 14 and the measurement unit 11 and determines the pedestrian's position, heading, velocity, etc. For example, in some implementations, the processor 12 may be a microprocessor in a cellular telephone, or hand-held/laptop computer carried by the pedestrian. In other implementations, the processor 12 may be integrated with other components of the navigation system 10, such as the measurement unit 11. In some implementations, the data communication between the processor 12 and other components of the navigation system 10 is implemented wirelessly. In some implementations, the data communication between the processor 12 and other components of the navigation system 10 is implemented by a physical connection between the processor 12 and the other components.

Figure 3:
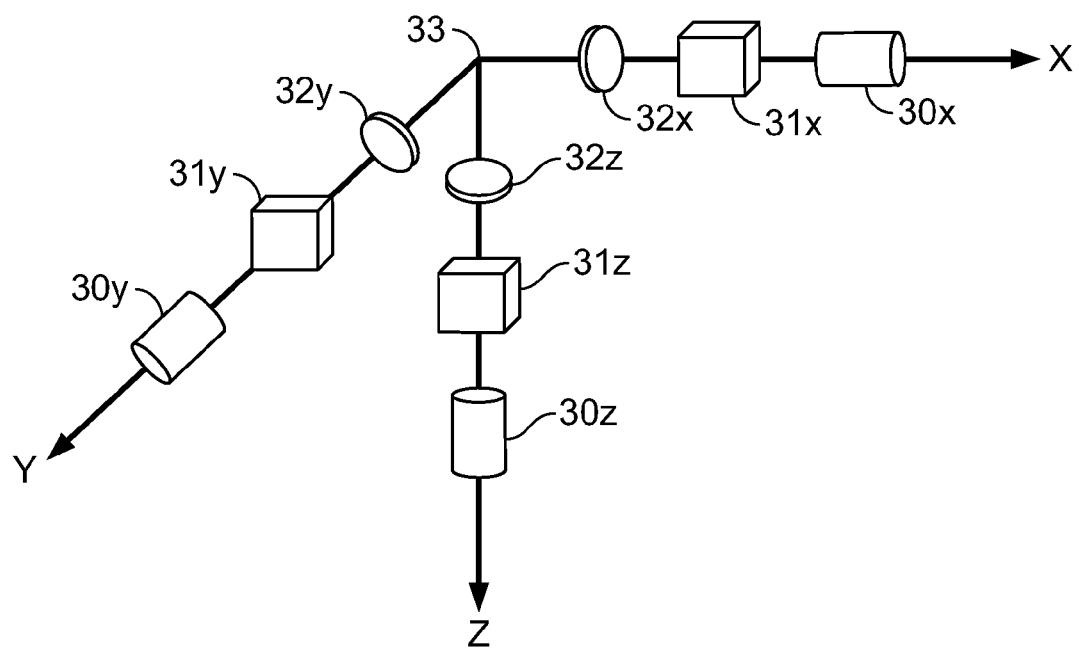
FIG. 3 is a schematic view of a measurement unit.

FIG. 3 shows a schematic view of a measurement unit 11. The magnetometers 32x, 32y, 32z of the measurement unit 11 provide signals that can be processed to determine a magnetic compass heading. When GPS is available, the compass is calibrated using the GPS signal. The calibration enables the compass to determine the pedestrian's heading relative to geographic (or "true") north, as opposed to a compass heading of magnetic "north," which may itself deviate from true magnetic north due to local magnetic field variation. During periods of GPS outage, the compass heading is used in conjunction with the inertial instruments to robustly track the pedestrian.

As seen from FIG. 3, the measurement unit 11 of the navigation system 10 (see FIG. 1) contains inertial and magnetic instruments. The inertial instruments include accelerometers 30x, 30y, 30z and gyroscopes 31x, 31y, 31z. The magnetic instruments include magnetometers 32x, 32y, 32z. Each inertial or magnetic instrument has an input axis. Each of the accelerometers 30x, 30y, 30z detects acceleration in a direction parallel to its input axis. Each of the gyroscopes 31x, 31y, 31z detects angular rotation about its input axis. Each magnetometer detects the strength of a magnetic field that is parallel to its input axis.

In some implementations, the instruments are arranged and rigidly secured so that the input axes of each group of instruments (accelerometers 30x, 30y, 30z, gyroscopes 31x, 31y, 31z, or magnetometers 32x, 32y, 32z) form an orthogonal reference frame. In some implementations, the coordinate frames defined by all three families of instruments are coincident. Any of these coordinate frames can be referred to as the "body frame," or b-frame 33. The navigation reference frame, or "n-frame," is a reference frame in which the navigation system 10 is tracked. For example, one n-frame has x-, y-, and z-coordinate axes corresponding to North, East, and down, respectively.

In some implementations, the measurement unit 11 contains only inertial instruments. In these implementations, the navigation system 10 contains magnetometers 32x, 32y, 32z positioned with a trackable orientation with respect to the measurement unit 11. For example, the magnetometers 32x, 32y, 32z need not be positioned on the pedestrian's foot, as shown in FIGS. 2A and 2B.

The measurement unit 11 can be an InertiaCube™, available from InterSense Inc. of Bedford, Mass. The inertial or magnetic instruments can be micro-electro-mechanical systems (MEMS). The gyroscopes 31x, 31y, 31z can be coriolis gyroscopes.

The navigation system 10 tracks a broad range of movement, including backwards and sideways steps, using signals provided by the measurement unit 11, including using angular or linear acceleration in any direction that is detected by the measurement unit 11 and resolved into components parallel to each b-frame axis. Magnetic fields in any direction are similarly detected and resolved by the measurement unit 11.

Figure 4:
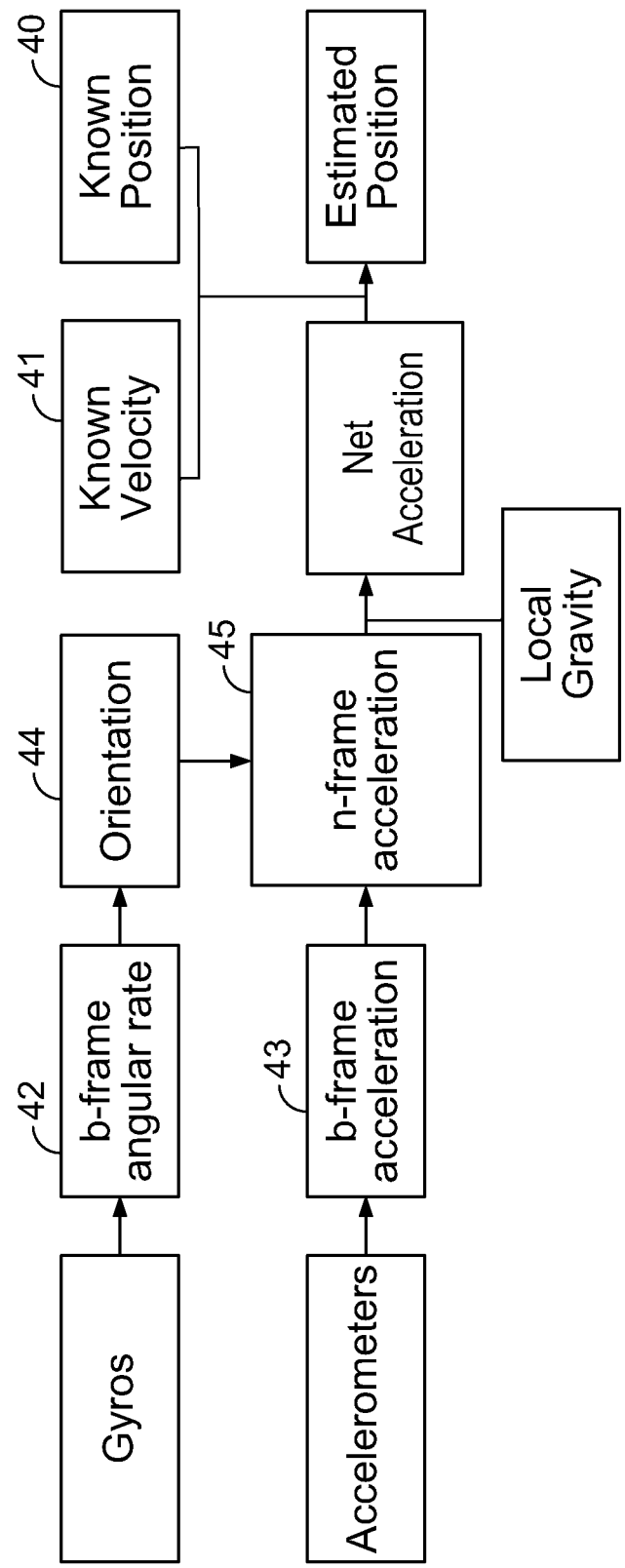
FIG. 4 is a schematic view of a general dead-reckoning system.

Referring to FIG. 4, the navigation system 10 is able to use signals provided by the measurement unit 11 to generally determine the position and orientation of the pedestrian by dead reckoning. Except for the modifications involving pseudo-measurements or transfer alignment described below, the navigation system 10 tracks the pedestrian as follows. Starting with a known position 40 and a known velocity 41, the inertial instruments of measurement unit 11 periodically samples the b-frame angular rate 42 and linear acceleration 43. The b-frame angular rate 42 is integrated to determine the measurement unit's orientation 44. The b-frame linear acceleration 43 is converted to n-frame acceleration 45 by making use of the orientation 44, which relates the b-frame to the n-frame. The n-frame acceleration 45 is combined with local gravity to produce net linear acceleration 49. The net linear acceleration 49 is twice integrated (using the known velocity 41 and position 40 as initial conditions for the respective integrations) to determine a new velocity and position of the pedestrian.

Typically, the inertial instruments take measurements at a sampling rate between 100 and 600 Hz, and the pedestrian's position, velocity, etc. are updated by the processor 12 after each measurement. Other sampling rates are also possible; slower sampling rates may result in reduced accuracy due to numerical integration error. The magnetic instruments preferably take measurements only during the stance phase of the step. As discussed more fully below, magnetic measurements are susceptible to different sources of inaccuracy than the inertial instruments, and the relatively slow sampling rate of the magnetic instruments helps avoid over-reliance on any particular inaccurate measurement.

Enhancements of Dead Reckoning

One way the navigation system 10 tracks the pedestrian is by a prediction/correction algorithm. Such an algorithm generally operates in two phases. During the "prediction" phase, the navigation system 10 predicts the position and orientation that the measurement unit 11 will have when the next measurement is made. During the "correction" phase, the navigation system adjusts the previously-made prediction of the measurement unit's position and orientation, in light of the most recent measurement. Prediction/correction algorithms may be implemented, e.g., by an extended Kalman filter.

The outputs of the inertial instruments in the measurement unit 11 tend to drift over time. Instrument drift results in reduced accuracy of the measurements made by the instrument, and consequently in reduced accuracy in the position and orientation determinations made by the navigation system 10.

One way the effect of instrument drift can be reduced is by recalibrating the drifting instruments at times when the result of a given measurement is known from another source. For example, such a source is the pedestrian's natural body mechanics while walking or crawling. While walking, the pedestrian's foot periodically enters a "stance" phase, when the foot is motionless on the ground. During this phase, the measurement unit 11 mounted on the foot also remains motionless.

Another way to reduce the effect of instrument drift is by using an external source of data in addition to the drifting instruments. For example, global navigation satellite systems (such as GPS, Glonass, Galileo, etc.) can provide another source of data, when such sources are available. Other external sources of data include beacons present in the pedestrian's environment and map correlation techniques.

The magnetic instruments $32x$, $32y$, $32z$ can also be used to manage the drifting inertial instruments. To enhance the effectiveness of this technique, the magnetometers $32x$, $32y$, $32z$ are calibrated. During the calibration, the magnetometers $32x$, $32y$, $32z$ are aligned with true north (as opposed to magnetic north) using global navigation satellites, or another technique. Additionally, magnetic distortions (such as those due to metal in the pedestrian's boot near the magnetometers $32x$, $32y$, $32z$) are accounted for.

In some implementations, the navigation system 10 can be dependent on a compass to control yaw drifts. In such implementations, the navigation system 10 may not work satisfactorily in some environments especially in the vicinity of metals. Improving the ability of the compass sensors to operate in the face of magnetic disturbances results in improved performance even in the vicinity of metals such as steel. The improved system may then be used inside buildings which typically contain metals including steel. In some implementations, the ability to reject magnetic disturbances is proportional to the quality of gyros used in the system. However, even with improved gyros, extracting reliable heading information from magnetometers in a metal rich environment can be difficult. Such a situation may arise when one object is trying to follow or track another object. In real life, a second fire fighter, for example, may be tracking or following a first fire fighter to aid or rescue him from a building. In general the internal layout of the building will not be known and therefore algorithms such as map matching or RF triangulation may not work well. In addition, existence of a linear path between two points may not be assumed due to the presence of walls or other obstructions between the points.

Figure 5:
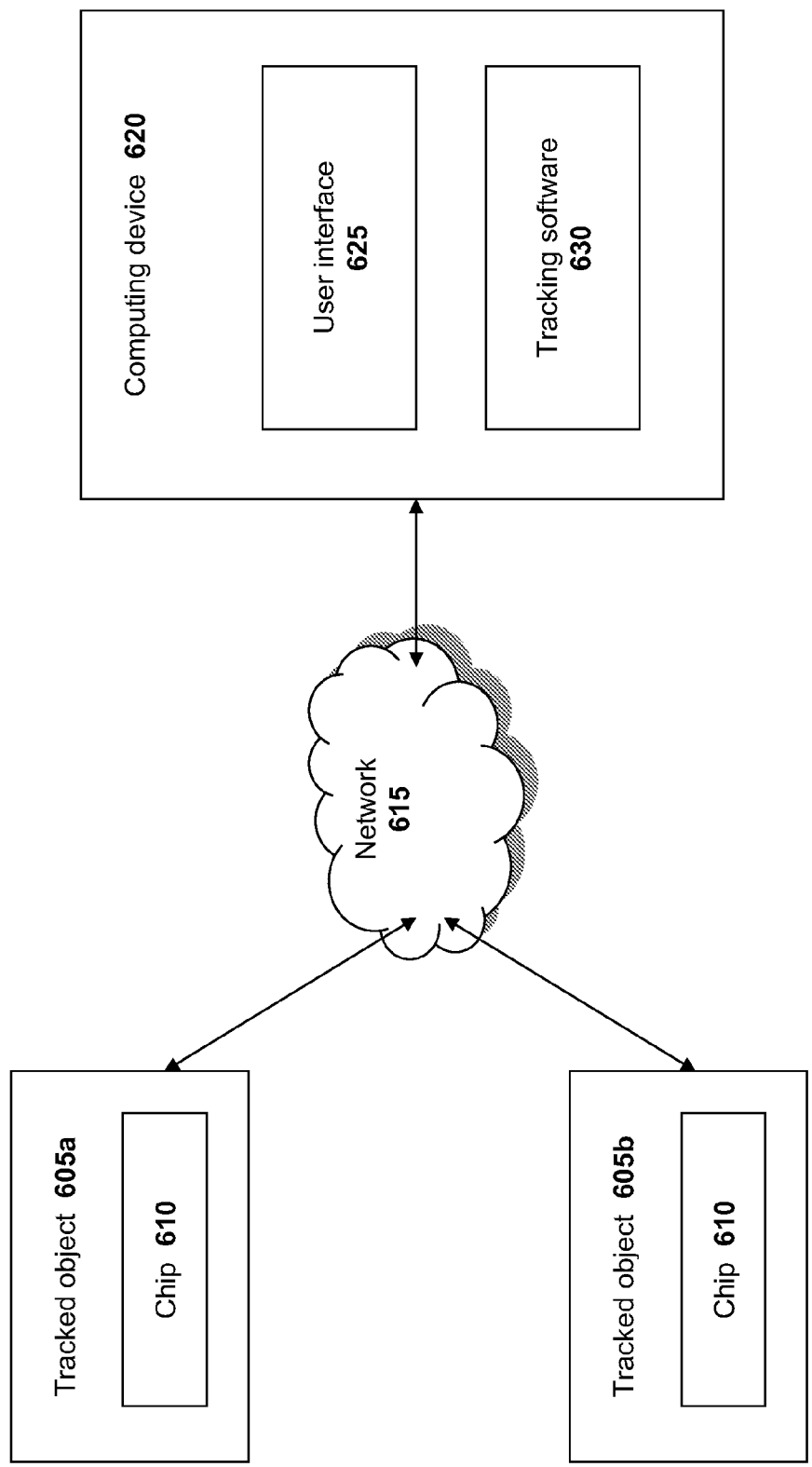
FIG. 5 is a schematic view of an object tracking system.

In some implementations, sparse RF range aiding may be used in such a situation to aid the inertial trackers. In some implementations, a trajectory matching algorithm that matches a path of the second firefighter with that of the first firefighter may be used. FIG. 5 is a block diagram depicting an example environment in which a trajectory matching system may be deployed. In brief overview, tracked objects 605a and 605b (605 in general) communicate with a computing device 620 (for example, a handheld mobile device). Each of the tracked objects 605 has a chip 610 that facilitates communication between the tracked object 605 and the computing device 620. In some implementations, the communication between the tracked objects 605 and the computing device 620 is over a network 615. The computing device may include a tracking software 630 and a user interface 625.

The tracked object 605 may include a firefighter, a police officer, a paramedic, a nurse, a doctor or other emergency responders. In some implementations, the tracked object 605 could be a manned or unmanned emergency vehicle or robot. The tracked object may be in communication with a control station continuously or periodically reporting its location and/or action. The tracked object 605 may include a chip 610 that facilitates communication with the computing device 620. The chip 610 may include one or more of a processor, a sensor, a GPS unit, a transmitter, a receiver and other electronic circuitry. In some implementations, the chip 610 may be embedded or integrated with the object 605. In other implementations, the chip 610 may be part of an external device or accessory located on the object 605. When the object 605 is a person such as a firefighter, the chip 610 may be embedded or located in a shoe worn by the person.

The network 615 may include one or more different types of network. For example, the network 615 may include a local area network (LAN), a metropolitan area network (MAN) or a wide area network (WAN) such as the Internet. In other implementations, the network 615 may include a combination of one or more different types of network. One or more gateway devices may act as interfaces between two different networks. In some implementations, the network 615 may include a satellite communication network such as one supporting a GPS system.

The network 615 can be of any type and form and may include any of the following: a point to point network, a broadcast network, a computer network, a power line network, an Asynchronous Transfer Mode (ATM) network, a Synchronous Optical Network (SONET), a Synchronous Digital Hierarchy (SDH) network, a wireless network and a wired network. If the network 104 is at least in part a wired network, the network 615 may include one or more of the following: coaxial cable, telephone wires, power line wires, twisted pair wires or any other form and type of wire. The topology of the network 615 may be a bus, star or a ring topology or any other topology capable of supporting the operations described herein.

A computing device 620 receives and processes data received from one or more tracked object 605. The computing device 620 may include a desktop or laptop computer, a handheld wireless device, a smart phone, a personal digital assistant, a server, a mainframe computer or any combination of these devices. The computing device may include a processor, a storage, memory, a display, a controller and other input/output devices. The computing device 620 may include a receiver, a transmitter, a transceiver or other communication circuitry configured to facilitate communication with the tracked objects 605.

The computing device 620 is configured to install and execute software code to process data received from the tracked objects 605. In some implementations, a tracking software 630 executes on the computing device to process such data. The tracking software 630 may execute locally such as on a desktop computer or wireless handheld device. In other implementations, the tracking software may execute on a server or a mainframe computer. The tracking software 630 may require a specific operating system for execution and may include one or more of any type and/or form of software, program, a web-based client, client-server applications, a thin-client computing client, an ActiveX control, a Java applet, or any other type and/or form of executable instructions capable of executing on the computing device 620. In some implementations, the tracking software 630 may include any type of software configured to support applications related to voice and real-time data communications, such as applications for streaming video and/or audio. The tracking software 630 may be configured to be installed and executed as an application on a smart phone such as an iPhone or a Blackberry.

The tracking software 630 may further include or work in conjunction with an user interface 625. The user interface may be rendered on a display of the computing device 620. Any software and/or application package may be used for rendering the user interface 625.

Figure 6:
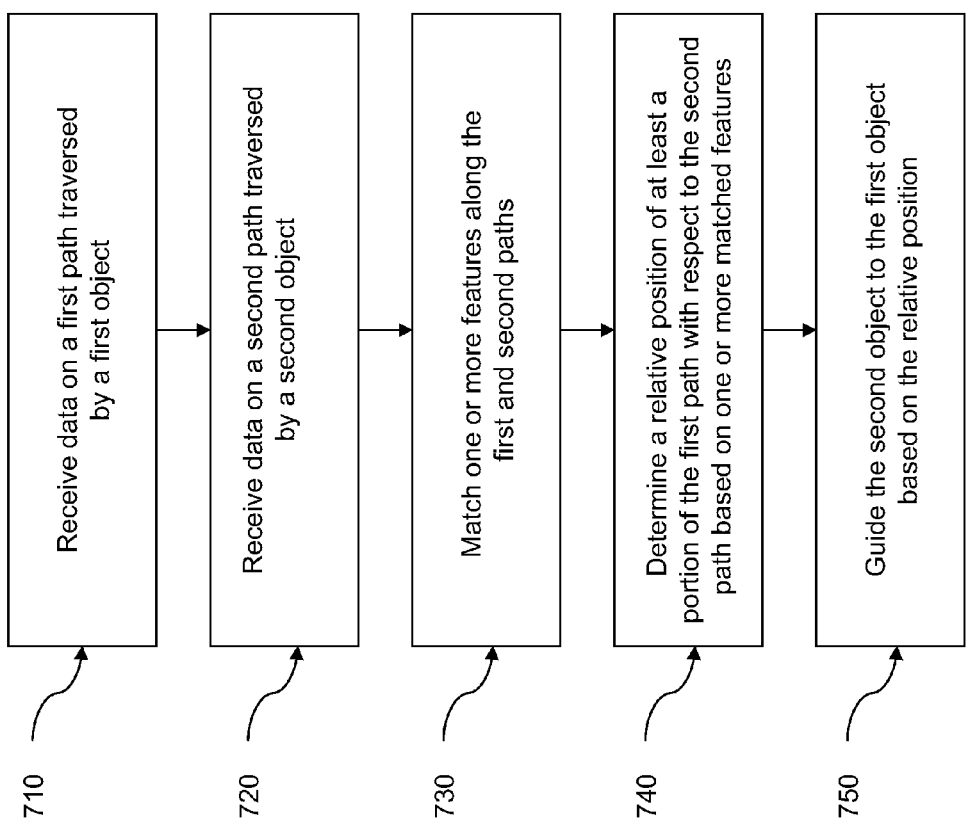
FIG. 6 is a flow diagram.

Referring now to FIG. 6, a flow diagram depicts a particular arrangement of operations implemented on a computing device using the tracking software 630 to track one or more objects. In some implementations, such operations allow a second object or person to be guided towards a first object or person based on tracking data received from the objects or persons.

Operations may include receiving 710 data on a first path traversed by a first object. In one example, the first object may be a person such as a firefighter or any other emergency responder. The data may be received via a receiver which is either a part of or works in conjunction with the computing device 620. Data on the first path may include absolute coordinates of the object or person with respect to a reference point. The data may also include information related to a heading drift of the object or person, acceleration, velocity, trajectory, angle of movement, inclination, slope, time or other parameters related to a motion of the object or person. In some implementations, the data may also include information on a location of the object or person. The data may be in any type and/or form such as audio, video and electromagnetic signals such as radio frequency waves. The data may be analog, digital or a combination thereof. The data may also include parameters related to the external conditions of the object or person. For example, the data may include information on temperature, visibility, gas composition and air quality at the location that the object or person is traversing. In some implementations, the data related to the first path may include a string of locations connected by hypothetical or imaginary linear springs between the locations. These string of locations may represent successive steps taken by a person or periodic locations of an object or person. The rest lengths of the hypothetical springs may be taken as distances between the successive locations. The data may also include information related by hypothetical or imaginary angular springs that represent the changes in direction between successive locations in the string of locations. The rest angle of such an angular spring may be taken as the angle between an incoming angle and an outgoing angle at a given location.

Operations may include receiving 720 data on a second path traversed by a second object. The data received from the second object may be of any type and form including but not limited to the types and forms described with respect to the data on the first path.

Operations may further include matching 730 one or more features along the first and second paths. Such feature matching is based on data on the first and second paths. In some implementations, the feature matching includes fixing the origin of both paths at substantially the same point. For example, when a firefighter is tracking down another firefighter inside a building, the origin of both paths or trajectories may be fixed at a known location such as an entrance door to the building. In other implementations, the origins of the paths may be fixed at two separate points separated by a known distance. This may happen in a situation when, for example, the two firefighters in the previous example enter the building through different doors.

Matching 730 may include finding points on the two paths or trajectories that correspond to each other. Such corresponding points may include a turn, a corner, a door, a window or a location having substantially same external parameters. The corresponding or matching points between the two paths may be marked either manually or automatically using the tracking software 630. In some implementations, a feature map of a facility, building or location may be created using these matched features even when no prior knowledge about the facility, building or location is available.

Matching 730 features between the two paths may be done by implementing any algorithm, technique and/or software package. For example, any feature matching and/or learning algorithms may be used to implement such functionality. Algorithms may include one or more machine learning algorithms such as a supervised learning algorithm based on training data, an unsupervised learning algorithm such as based on clustering or independent component analysis, a semi supervised learning algorithm and a transduction algorithm. Any combination of tools, and techniques may be used in the algorithms including but not limited to principal component analysis, neural networks, fuzzy logic, classification algorithms, genetic algorithms, simulated annealing, artificial intelligence and pattern recognition algorithms. Similarity metrics such as correlation coefficient, mutual information and difference based metrics may be used to evaluate a similarity between matching features.

Operations further include determining 740 a relative position of at least a portion of the first path with respect to the second path based on the one or more matched features. In some implementations, this includes a bias correction between the two paths based on location of known points. For example, when a fireman is tracking another fireman in a building and a point in each of their paths is identified as a matching point, the two points may be aligned or "snapped back" together even if there is some difference between the absolute locations of the points. This may correct or fix a drift of the second path with respect to the first path at that location. Such drift correction may be done by calculating and using a drift correction vector. In some implementations, such alignment at some locations of the two paths would re-orient the relative positions of the two path at other locations. Such orientation may cause another portion of the path of a second firefighter (who is following the first firefighter) to rotate and translate as if the path was a rigid object. For example, applying the imputed drift correction vector to the subsequent inertial portions of the second path will introduce a future correction vector. Additional correction points will serve to enhance the accuracy of that drift correction vector. Such re-orientation, may in some cases, provide a more accurate positioning of the path of the second firefighter with respect to the path of the first firefighter.

Operations may optionally include guiding 750 the second object or person to the first object or person based on the relative position of the two paths. In some implementations, a live person, such as a commander at a remote location, may analyze the aligned paths visibly and issue instructions to the second object or person to reach the first object or person. In other implementations, an automated software or system may analyze the data and issue appropriate instructions to the second object or person.

Figure 7:
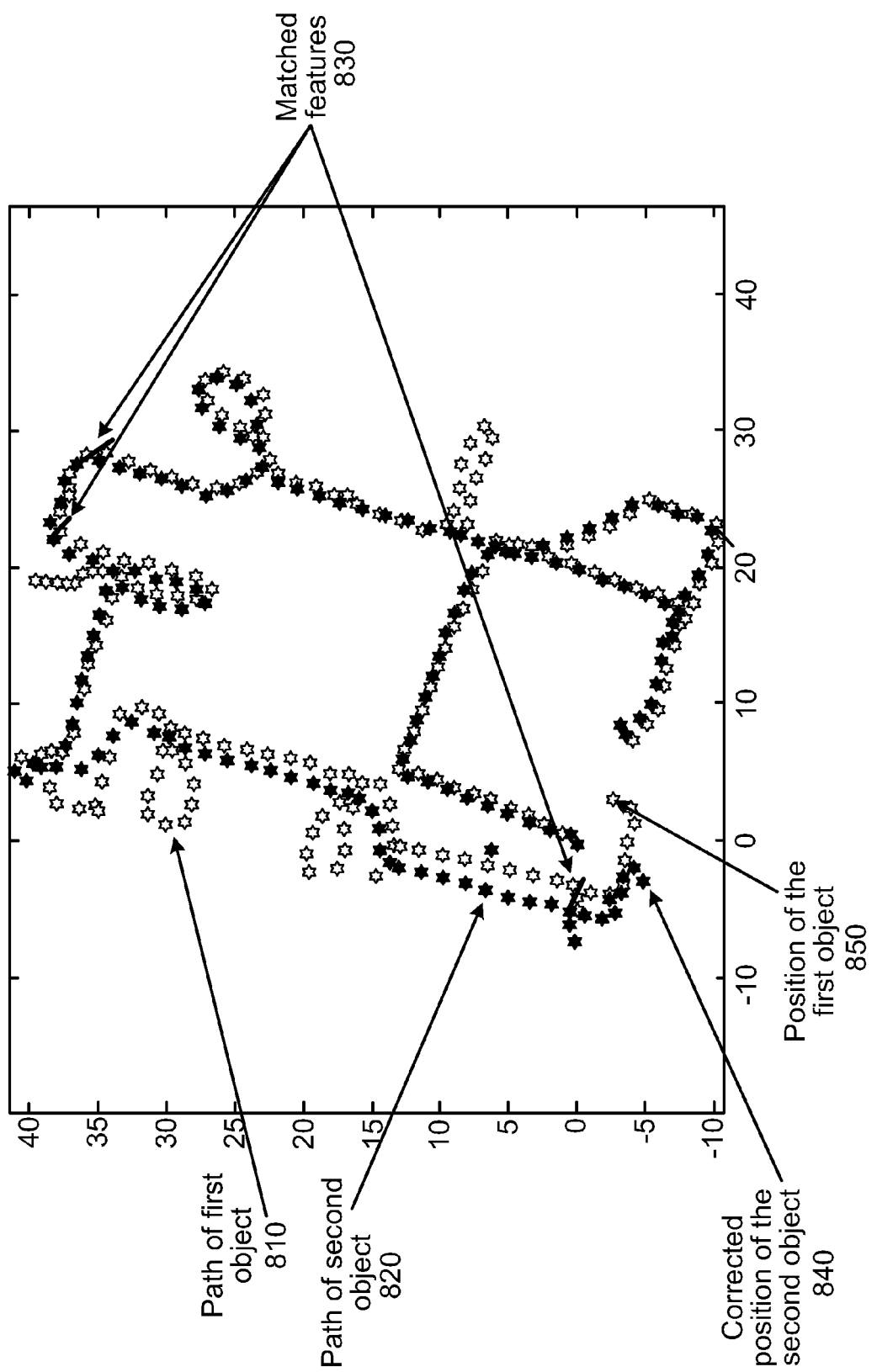
FIG. 7 is an exemplary plot depicting tracking of two objects.

Referring now to FIG. 7, an exemplary plot depicting the tracked paths of two objects or persons are shown. In this example the drift of the second path 820 with respect to the first path 810 is corrected using the matched features 830 as reference points. This yields a more accurate relative position of the first object or person 850 with respect to the corrected position of the second object or person 840. Using this information, the second object or person may be directed more accurately towards the first object or person.

Embodiments can be implemented using hardware, software, or a combination of hardware and software. Software embodiments, or software portions of embodiments, can be in the form of instructions on a computer-readable medium for execution on a data processor, such as a digital signal processor or a general purpose microprocessor. Other embodiments are also within the scope of the following claims.

What is claimed is:

1. A computer-implemented method comprising receiving first data from an inertial tracking device worn by a first person, the first data defining a first tracked path traversed by the first person;

receiving second data from an inertial tracking device worn by a second person, the second data defining a second tracked path traversed by the second person;

identifying a first location on the first tracked path that substantially matches a second location on the second tracked path;

calculating a correction parameter based on a separation between the first location and the matching second location;

adjusting one or both of said first or second tracked path by applying the correction parameter to bring the first and second tracked paths into closer alignment; and performing at least one action from the group of (a) displaying the more closely aligned first and second tracked paths on a visual display; and (b) providing automated instructions to the second person based on the more closely aligned first and second tracked paths.

2. The method of claim 1 in which the first and second locations are at successive footsteps of the first or the second person along the first or second tracked path, respectively.

3. The method of claim 1 in which the first and second tracked paths are determined based on identification of one or more known reference points.

4. The method of claim 1 further comprising, receiving third data from said second inertial tracking device, said third data defining an extension of said second path, and applying said correction parameter to locations on said extension to realign said extension.

5. The method of claim 1, wherein the correction parameter is applied to an additional location on said first path.

6. The method of claim 1, wherein the correction parameter is applied to an additional location on said second path.

7. The method of claim 1, wherein applying the correction parameter comprises adjusting a location other than said first or said second location.

8. The method of claim 1, comprising displaying the more closely aligned first and second tracked paths on a visual display.

9. The method of claim 1, comprising providing automated instructions to the second person based on the more closely aligned first and second tracked paths.

10. A computer-implemented method comprising receiving first data from an inertial tracking device worn by a first person, the first data approximating a set of first locations along a path that was traversed by the first person;

receiving second data from an inertial tracking device worn by a second person, the second data approximating a set of second locations being traversed by the second person;

estimating a correction parameter based on a separation between a given second location and a corresponding first location, wherein the corresponding first location is determined by correlating features associated with the first and second locations;

estimating a current location of the second person with respect to the path based on the correction parameter; and performing at least one action from the group of (a) displaying said more closely aligned first and second tracked paths on a visual display; and (b) providing automated instructions to said second person based on said more closely aligned first and second tracked paths.

11. The method of claim 10 in which the first and second locations are at successive footsteps of the first or the second person along the first or second tracked path, respectively.

12. The method of claim 10 in which the first and second locations are determined based on identification of one or more known reference points.

13. The method of claim 10 further comprising, receiving third data from said second inertial tracking device, said third data including additional locations in the set of second locations, and applying said correction parameter to at least one of the additional locations to align the at least one additional location to the path.

14. The method of claim 10, comprising displaying the more closely aligned first and second tracked paths on a visual display.

15. The method of claim 10, comprising providing automated instructions to the second person based on the more closely aligned first and second tracked paths.

16. A computer program product comprising a computer readable storage device encoded instructions, which when executed, causes one or more processors to perform operations comprising:

receiving first data from an inertial tracking device worn by a first person, the first data defining a first tracked path traversed by said first person;

receiving second data from an inertial tracking device worn by a second person, the second data defining a second tracked path traversed by said second person;

identifying a first location on said first tracked path that substantially matches a second location on said second tracked path;

calculating a correction parameter based on a separation between the first location and the matching second location;

adjusting one or both of said first or second tracked path by applying the correction parameter to bring said first and said second tracked paths into closer alignment; and performing at least one action from the group of (a) displaying said more closely aligned first and second tracked paths on a visual display; and (b) providing automated instructions to said second person based on said more closely aligned first and second tracked paths.

17. The computer program product of claim 16, wherein the operations include receiving third data from the second inertial tracking device, the third data defining an extension of the second path, and applying the correction parameter to locations on the extension to realign the extension.

18. The computer program product of claim 16, wherein the operations include displaying the more closely aligned first and second tracked paths on a visual display.

19. The computer program product of claim 16, wherein the operations include providing automated instructions to the second person based on the more closely aligned first and second tracked paths.

20. A computer program product comprising a computer readable storage device encoded instructions, which when executed, causes one or more processors to perform operations comprising:

receiving first data from an inertial tracking device worn by a first person, the first data approximating a set of first locations along a path that was traversed by the first person;

receiving second data from an inertial tracking device worn by a second person, the second data approximating a set of second locations being traversed by the second person;

estimating a correction parameter based on a separation between a given second location and a corresponding first location, wherein the corresponding first location is determined by correlating features associated with the first and second locations;

estimating a current location of the second person with respect to the path based on the correction parameter; and performing at least one action from the group of (a) displaying said more closely aligned first and second tracked paths on a visual display; and (b) providing automated instructions to said second person based on said more closely aligned first and second tracked paths.

21. The computer program product of claim 20, wherein the operations include receiving third data from said second inertial tracking device, said third data including additional locations in the set of second locations, and applying said correction parameter to at least one of the additional locations to align the at least one additional location to the path.

22. The computer program product of claim 20, wherein the operations include displaying the more closely aligned first and second tracked paths on a visual display.

23. The computer program product of claim 20, wherein the operations include providing automated instructions to the second person based on the more closely aligned first and second tracked paths.

* * * * *